United States Patent [19]
Cook et al.

[11] Patent Number: 5,123,135
[45] Date of Patent: Jun. 23, 1992

[54] DOCK LEVELER SUPPORT STRUCTURE AND PIVOTING APPARATUS

[75] Inventors: Bobby A. Cook, Malvern; Leo Benson, III, Hot Springs, both of Ark.

[73] Assignee: Dock Leveler Manufacturing, Inc., Malvern, Ark.

[21] Appl. No.: 471,517

[22] Filed: Jan. 29, 1990

[51] Int. Cl.⁵ .............................................. B65G 11/00
[52] U.S. Cl. ..................................... 14/71.3; 14/71.7
[58] Field of Search ................ 14/69.5, 70, 71.1, 71.3, 14/71.5, 71.7

[56] References Cited

U.S. PATENT DOCUMENTS

| Re. 30,104 | 10/1979 | Burnham | 14/71.3 |
|---|---|---|---|
| 3,137,017 | 6/1964 | Pfleger et al. | 14/71.3 |
| 3,316,575 | 5/1967 | Larsen et al. | 14/71.3 |
| 3,323,158 | 6/1967 | Loomis | 14/71.3 |
| 3,368,229 | 2/1968 | Pfleger | 14/71.3 |
| 3,858,264 | 1/1975 | Kuhns et al. | 14/71.3 |
| 3,902,213 | 9/1975 | Pfleger et al. | 14/71.3 |
| 3,921,241 | 11/1975 | Smith | 14/71.3 X |
| 3,982,295 | 9/1976 | Burnham | 14/71.3 |
| 4,126,909 | 11/1978 | Smith et al. | 14/71.3 |
| 4,279,050 | 7/1981 | Abbott | 14/71.3 |
| 4,525,887 | 7/1985 | Erlandsson et al. | 14/71.3 |
| 4,531,248 | 7/1985 | Swessel et al. | 14/71.3 |
| 4,570,277 | 2/1986 | Hahn et al. | 14/71.3 |
| 4,823,421 | 4/1989 | Kleynjans et al. | 14/71.3 |

Primary Examiner—William P. Neuder
Attorney, Agent, or Firm—Finnegan, Henderson, Farabow, Garret & Dunner

[57] ABSTRACT

A dock leveler having a pivotable main deck, a lip plate pivotably connected to the main deck, and a lip plate extension apparatus for pivoting the lip plate from a stored position to a bridging position and for maintaining the lip plate in the bridging position at times when the main deck is in the fully raised position. Front plate gussets and lip plate gussets are provided for strengthening the pivotal connection between the main deck and the lip gate. Both the front plate gussets and the lip plate gussets include an end that conforms in shape to the hinge tube and is connected thereto. A recessed deck cup is provided in the main deck for housing a pull ring having a chain attached thereto. The deck cup has an area of decreased diameter and an outwardly flared bottom to provide a smooth surface for contacting the chain as the pull ring is pulled and for providing an interior constriction to hold the pull ring.

23 Claims, 13 Drawing Sheets

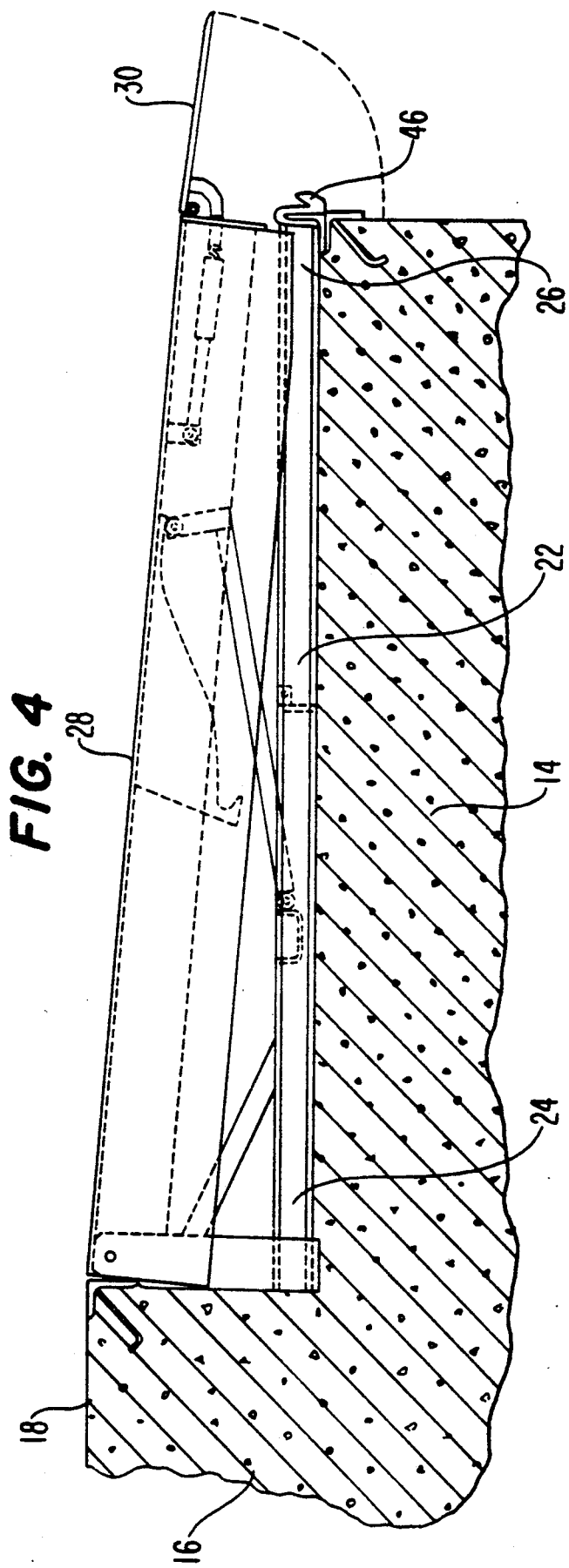

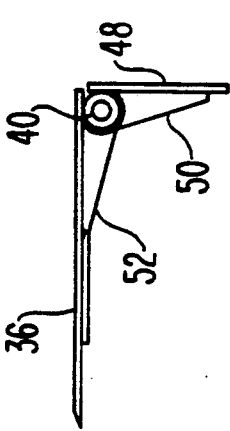
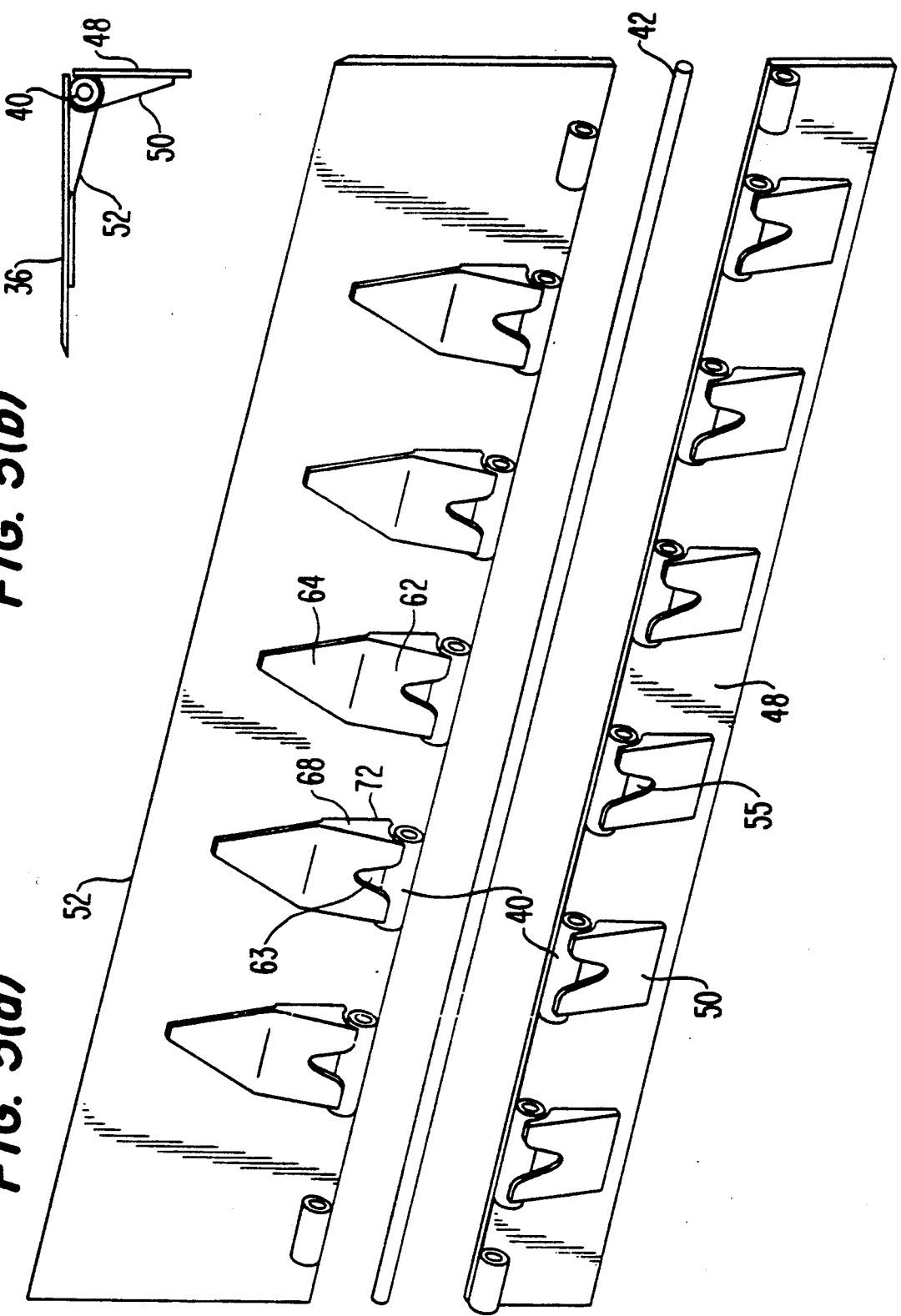

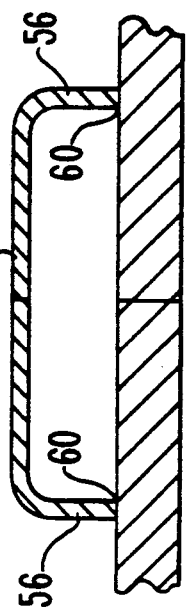
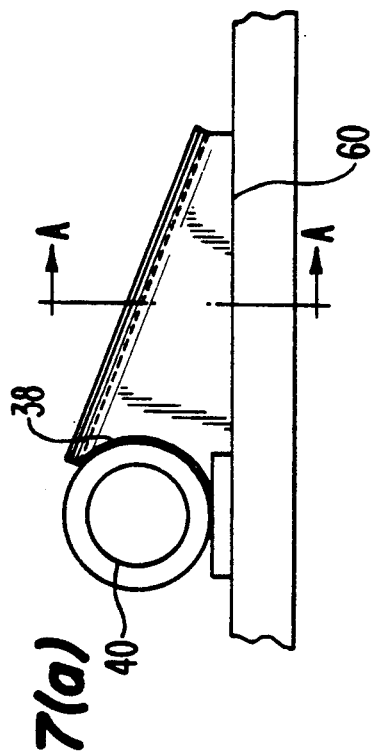
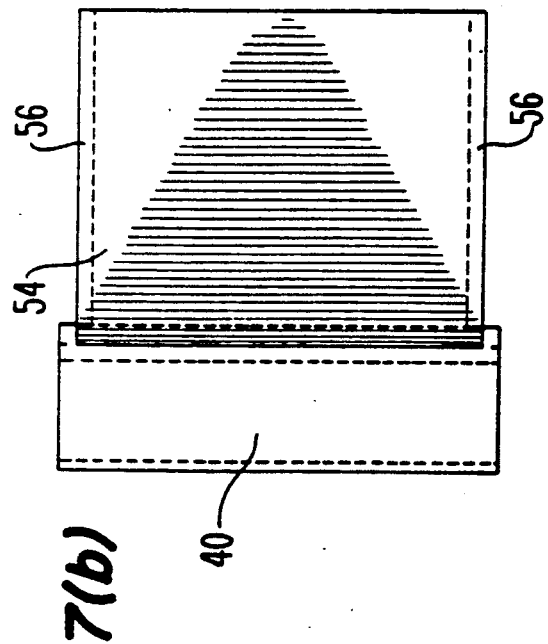

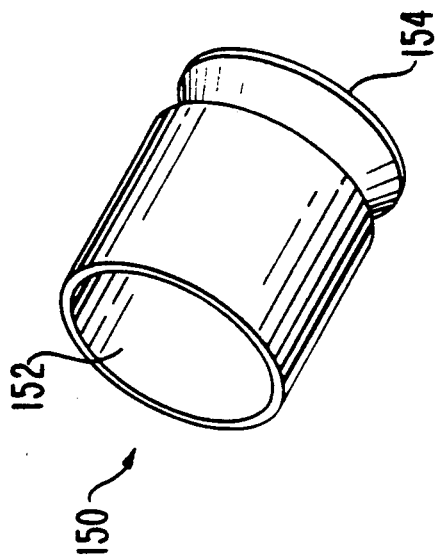
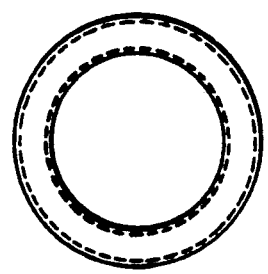
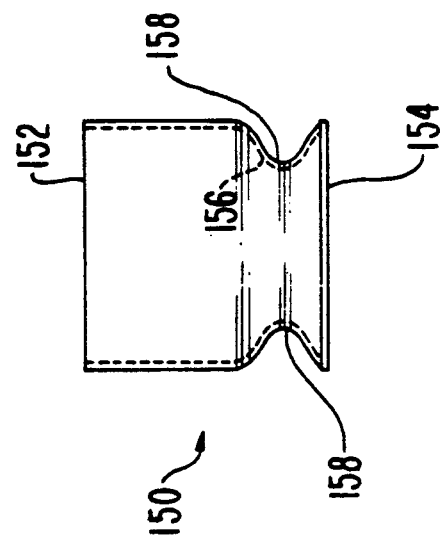

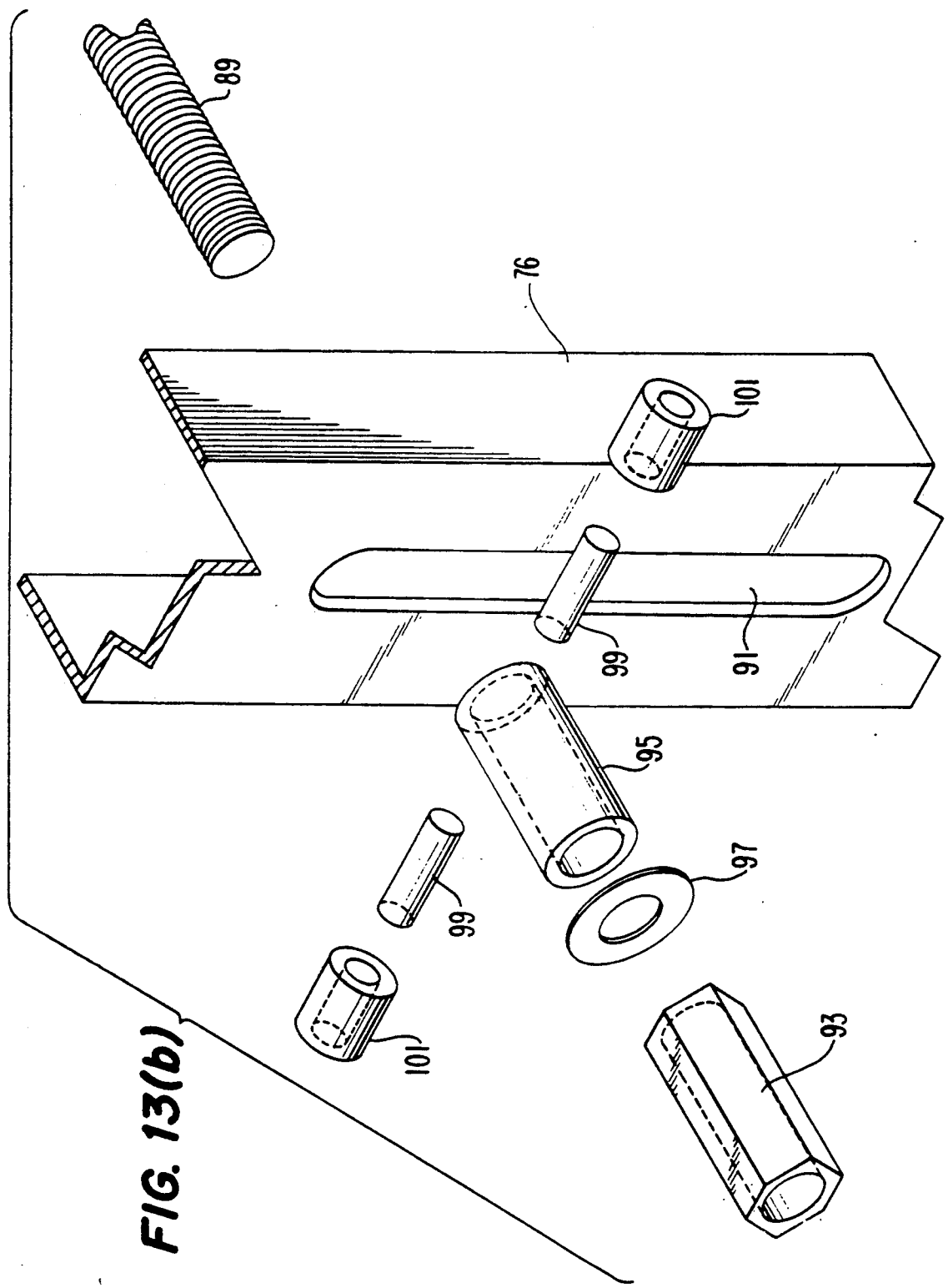

DOCK LEVELER SUPPORT STRUCTURE AND PIVOTING APPARATUS

BACKGROUND OF THE INVENTION

1. Field of the Invention

This invention relates to a dock leveler which acts as a bridge between a loading dock platform and the bed of carrier and, more particularly, to a pit-mounted dock leveler.

2. Description of the Related Art

Dock levelers for bridging a gap between a loading dock platform and a carrier bed are in widespread use to facilitate the loading and unloading of various types of carriers. Forklift trucks are often required to move from a loading dock directly into and out of the storage compartment of a carrier. In order to facilitate such an operation, dock levelers are used to compensate for any height variation that exists between the loading dock platform and the bed of a carrier.

Typically, a dock leveler will have a main deck which pivots relative to an adjacent loading dock platform and a lip plate which pivots relative to the main deck. The lip plate will rest directly on the bed of a carrier when the dock leveler is positioned as a bridge and will support the main deck at a selected level relative to an adjacent loading dock platform when the dock leveler is in a stored position. Movement of the main deck and lip plate can be achieved by either mechanical means or by fluid pressure.

In a mechanical pit-mounted dock leveler of the type illustrated in FIG. 1, a lift arm assembly provides a constant upward bias on the main deck. These lift arm assemblies typically include a set of four counterbalance springs that must be individually adjusted to provide the desired upward bias on the main deck. A hold-down device is necessary to maintain the main deck at the desired level. When the hold-down device is released, the main deck will automatically be pivoted upwardly by the lift arm assembly to its fully raised position. An operator will then walk down the main deck to the desired level. Once the desired level is reached, the operator steps off the main deck and the hold-down device maintains the main deck at the desired level.

Typically, a mechanical dock leveler includes a lip extension mechanism to pivot the lip plate to an extended bridging position for resting on the bed of a carrier. The lip plate is often counterbalanced to reduce the force necessary to extend the lip plate to the bridging position. Prior art dock levelers have experienced problems in supplying sufficient counterbalancing force to satisfactorily reduce the force necessary to extend the lip plate during the dock leveler opening cycle without hindering the descent, by gravity, of the lip plate during the recycling operation from the extending bridging position to a stored position. In the stored position, the lip plate will rest in keepers provided on the front of the dock leveler frame to support the main deck in a position that is level with the loading dock platform.

Another problem with prior art lip extension mechanisms is that when the dock leveler is cycled and the lip plate is extended to the bridging position, the lip plate will not remain in the extended bridging position. Rather, the lip plate will immediately began to descend to its stored position. The operator will often not have enough time to walk the dock leveler down into engagement with the carrier bed while the lip plate is extended.

A problem with dock levelers that include a pivotably connected main plate and lip plate is that the pivotal connection between these two plates is a weak structural point that limits the load bearing capacity of the leveler. Strengthening this pivotal connection will increase the load bearing capacity of the leveler, thus making it more desirable to the industry. Prior art dock levelers have included a flat bar welded from a hinge tube to the lip plate as a means for strengthening this pivotal connection. However, the flat bar does not provide the necessary support to negate the inherent weakness of the pivotal connection between the main plate and the lip plate.

Another problem with dock levelers is associated with the deck cups that are used to house pull rings attached to chains that release the hold-down mechanism and retract the safety legs for below dock operation. Both the pull ring and the deck cup must be recessed so that they do not interfere with traffic across the main deck. Prior art deck cups typically include a substantially enclosed bottom for capturing the pull ring so that it can be grasped from the top of the main deck. However, such deck cups provide a rough surface that contacts the chain when the pull ring is pulled. This rough surface causes wear on the chain that will eventually necessitate replacement and also causes resistance in the operation of the hold-down mechanism and safety legs. Also, the substantially enclosed deck cups are known to accumulate dirt and other types of debris that must be periodically removed.

SUMMARY OF THE INVENTION

Accordingly, it is a primary object of this invention to provide a dock leveler having a strengthened pivotal connection between the main deck and the lip plate.

It is a further object of this invention to provide a lip extension mechanism that will maintain the lip plate in the bridging position to allow the dock leveler to be walked down into engagement with the carrier bed.

It is yet another object of this invention to provide a lift arm assembly that can be easily adjusted.

It is still a further object of this invention to provide a deck cup for a dock leveler that does not accumulate debris and can house a pull ring and provide a smooth surface for contacting the chain attached to the pull ring.

To achieve the foregoing objects in accordance with the purposes of the invention as embodied and broadly described herein, the dock leveler of this invention comprises a frame having a first end to be disposed adjacent a loading dock platform and second opposite end spaced outwardly from the first end. A main deck is provided having a first edge pivotably connected to the first end of the frame for pivoting the main deck relative to the plane of the loading dock platform between a first and second position. A lip plate is provided having a first edge pivotally connected to the second edge of the main deck for pivoting the lip plate between a first and second position. Hinge means pivotably connect the second edge of the main deck to the first edge of the lip plate, the hinge means including at least one hinge tube. Support means are provided for strengthening the pivotal connection between the main deck and lip plate, the support means conforming in shape to the hinge tube and extending outwardly therefrom. Means are provided for pivoting the main deck about its first edge from its first position to its second position and for pivoting the lip plate from its first position to its second position. The lip plate pivoting means includes means for maintaining the lip plate in the second position at times when the main deck is in its second position.

Preferably, the dock leveler further comprises a front plate connected to the main deck adjacent its second edge and extending downward therefrom. It is preferred that the support means include at least one front plate gusset connected to the hinge tube and extending onto the front plate and at least one lip plate gusset connected to the hinge tube and extending onto the lip plate. Preferably, both the front plate gusset and lip plate gusset include an end that conforms to the shape of the hinge tube and is connected thereto.

Preferably, the lip plate pivoting means includes linkage means attached the main deck, means for pivoting the linkage means in response to upward movement of the main deck to its second position, and lip extension means responsive to pivotal movement of the linkage means for extending the lip plate to the second position. The lip extension means preferably includes a lip extension member and a slide bar, the slide bar being disposed to engage the linkage means and slide along the linkage means as it is pivoted. The movement of the slide bar causes the lip extension member to extend the lip plate to the second position and to maintain the lip plate in the second position at times when the main deck is in the second position.

In another aspect of the present invention, there is provided a deck cup for housing a dock leveler pull ring having a chain attached thereto. The deck cup comprises a substantially tubular body having an open top and bottom, with the substantially tubular body having an non-uniform inside diameter. A portion of the tubular body adjacent the bottom has a decreased diameter to form an interior constriction for holding the pull ring. The bottom of the tubular body is flared outwardly to provide a smooth surface for contacting the chain attached to the pull ring.

The accompanying drawings, which are incorporated in and constitute a part of the specification, illustrate one embodiment of the invention and together with the description serve to explain the principles of the invention.

BRIEF DESCRIPTION OF THE DRAWINGS

FIG. 4 is a sectional side view of the dock leveler illustrating the main plate in the below dock position and the lip plate in the bridging position.

FIG. 5(a) is an exploded view of the front plate and lip plate of a dock leveler made in accordance with the present invention;

FIG. 5(b) is a side view illustrating the connection between the front plate, lip plate, and support gussets of the present invention;

FIG. 7(a) is partial side view of the front plate gusset connected to the front plate and the hinge tube;

FIG. 7(b) is a partial top view of the front plate gusset shown in FIG. 7(a);

FIG. 7(c) is a sectional view taken along the line A—A in FIG. 7(a);

FIG. 12(a) is a perspective view of the deck cup of the present invention;

FIG. 12(b) is a side view of the deck cup of the present invention;

FIG. 12(c) is a bottom view of the deck cup of the present invention;

FIG. 13(b) is an exploded view of a portion of the lift arm assembly shown in FIG. 13(a).

DESCRIPTION OF THE PREFERRED EMBODIMENT

Figure 1:
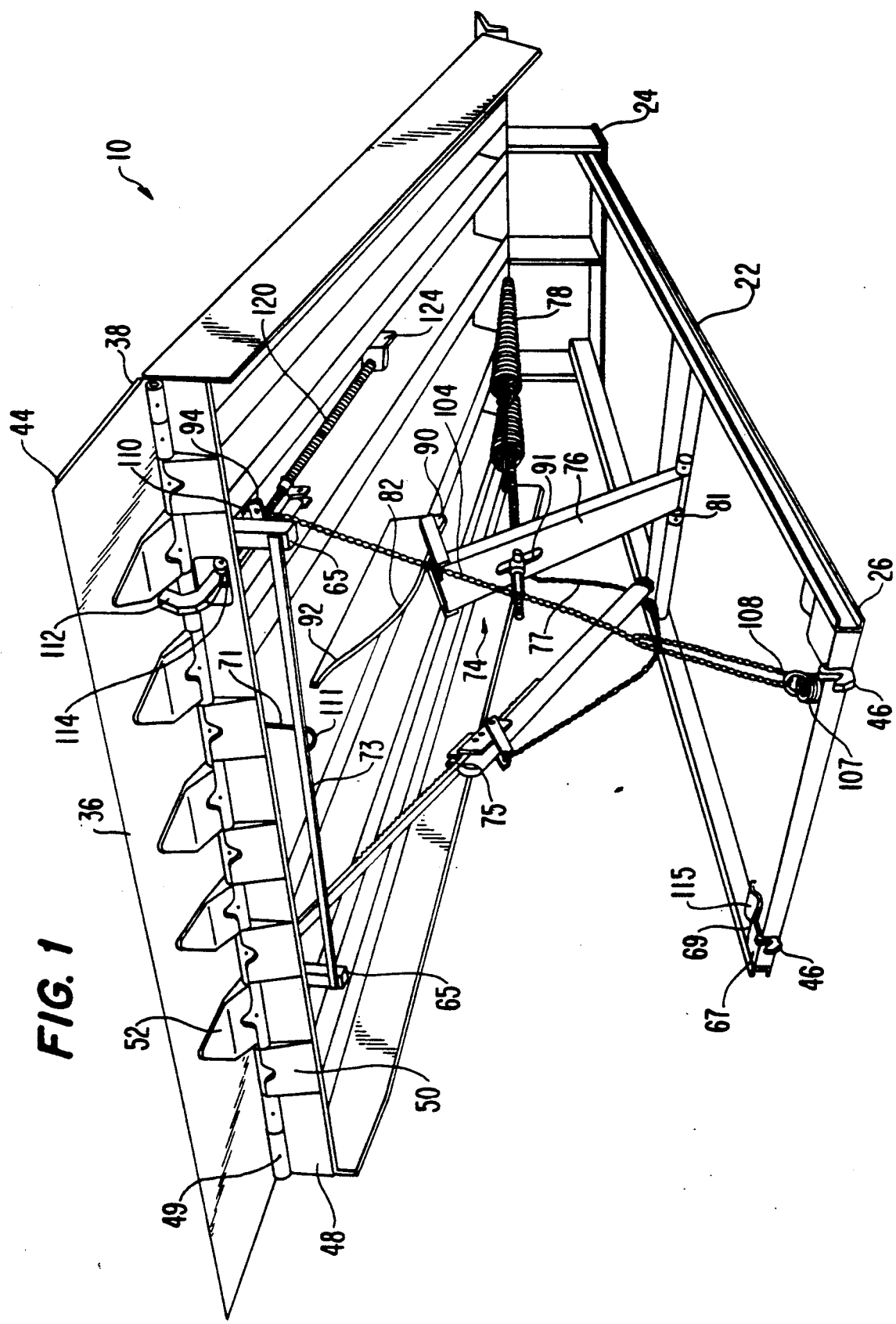
FIG. 1 is a perspective view of a dock leveler made in accordance with the present invention.
Figure 2:
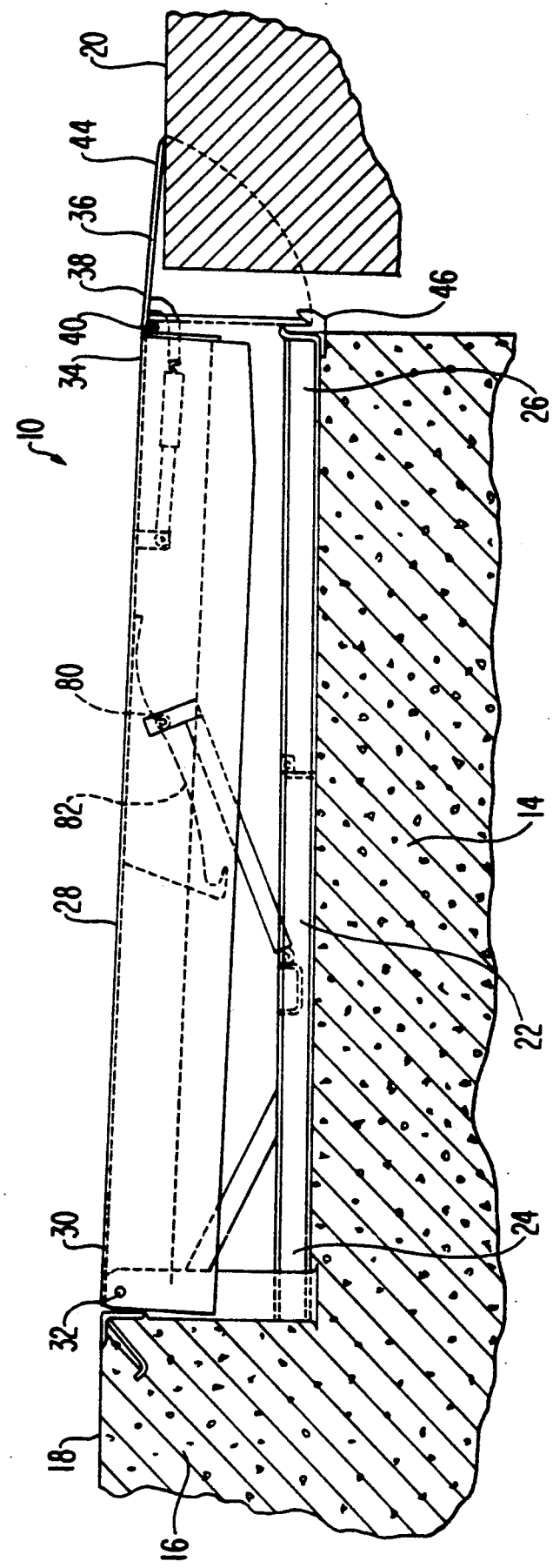
FIG. 2 is a sectional side view of the dock leveler illustrating the main deck in a position co-planar with the loading dock platform and the lip plate in the bridging position.

The preferred embodiment of the dock leveler of the present invention is shown in FIGS. 1–4 and is represented generally by the numeral 10. Referring now to FIG. 2, it can be seen that dock leveler 10 is adapted to be located within a pit 14 provided in a loading dock 16 to bridge a gap between a loading dock platform 18 and a carrier bed 20.

In accordance with the present invention, the dock leveler includes a frame having a first end to be disposed adjacent a loading dock platform and a second opposite end spaced outwardly from the first end. As embodied herein, dock leveler 10 includes a frame 22 adapted to be disposed within a pit 14 provided in loading dock 16. Frame 17 has a first end 24 to be disposed adjacent loading dock platform 18 and a second opposite end 26 spaced outwardly from first end 24.

In accordance with the present invention, the dock leveler includes a main deck having first and second opposite edges. The first edge is pivotably connected to the first end of the frame to pivot the main deck relative to the plane of the loading dock platform between a first and second position. As embodied herein, dock leveler 10 includes a main deck 28 having a substantially planar upper surface over which a forklift truck or the like may move during the unloading or loading of carrier bed 20. A first edge 30 of main deck 28 is pivotably connected to frame 22 by a hinge bracket 32 mounted on the underside of main deck 28 and the upper portion of frame 22. Main deck 28 can be pivoted along hinge bracket 32 to form an inclined surface relative to loading dock platform 18. In a preferred embodiment of the present invention, a front plate 48 is connected to main deck 28 adjacent a second edge 34 thereof. Front plate 48 extends downwardly from main deck 28.

In accordance with the present invention, the main deck can be pivoted between a first and second position. As embodied herein, the first position is a below dock position illustrated in FIG. 4 wherein the second edge 34 of main deck 28 is at its lowest position below the loading dock platform 18. As further embodied herein, the second position is a fully raised position illustrated in FIG. 3 wherein the second edge 34 of main deck 28 is at its highest position above loading dock platform 18.

Figure 13A:
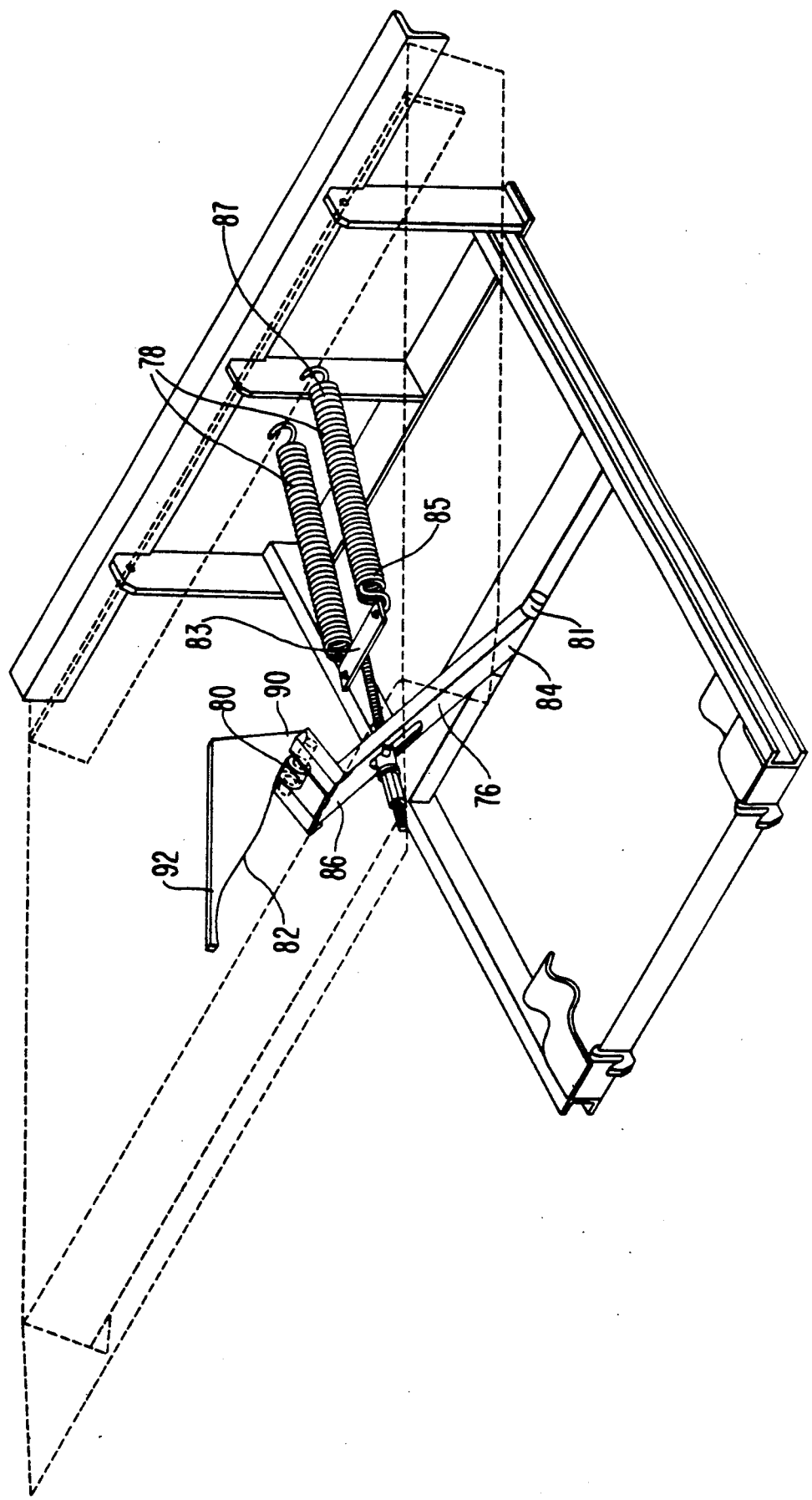
FIG. 13(a) is a perspective view of the lift arm assembly of the dock leveler of the present invention.

The dock leveler of the present invention includes means for pivoting the main deck about its first edge to its second position. As embodied herein, the means for pivoting main deck 28 includes a lift arm assembly designated generally by the reference numeral 74. Lift arm assembly applies a constant upward bias on main deck 28. As embodied herein and as shown in FIG. 13(a), lift arm assembly 74 includes lift arm 76, a pair of counterbalance springs 78, roller 80 and cam surface 82. A first end 84 of lift arm 76 is pivotally connected to frame 22 through pivot tubes 81 and a second end 86 of lift arm 76 includes roller 80 that moves along cam surface 82. Cam surface 82 includes a rear end 90 and a front end 92. When main deck 28 is in the fully raised position, roller 80 is positioned at rear end 90 which includes a U-shaped portion to act as a stop. When main deck 28 is in the below dock position, roller 80 is positioned at front end 92 of cam surface 82.

As shown in FIG. 13(a), lift arm assembly 74 preferably includes a connecting bar 83 to which a first end 85 of counterbalance springs 78 is connected. A second end 87 of counterbalance springs 78 is connected to dock leveler frame 22. Extending forwardly from connecting bar 83 is threaded rod 89 that extends through slot 91 in lift arm 76. Threaded rod 89 is preferably welded to the underside of connecting bar 83.

With reference to FIG. 13(b), threaded rod 89 is threadably engaged with adjustment nut 93. Tubular sleeve 95 and washer 97 are positioned on the front end of lift arm 76 to prevent adjustment nut 93 from sliding through slot 91. Pivot rods 99 are welded to sleeve 95 and inserted into pivot tubes 101 that are welded to lift arm 76. Threaded rod 89, sleeve 95 and adjustment nut 93 pivot about pivot rods 99 as lift arm 76 is pivoted about pivot tubes 81 at times when main deck 28 is being pivoted. The pivoting action about pivot rods 99 enables the orientation of threaded rod 89 to remain substantially the same, i.e., substantially parallel to the bottom of pit 14, regardless of the position of lift arm 76. Maintaining the orientation of threaded rod 89 in a substantially constant orientation ensures that counterbalance springs 78 exert a constant force on lift arm 76 throughout its pivotal range. Adjustment of both counterbalance springs 78 is accomplished by adjusting the position of adjustment nut 93 on threaded rod 89.

Because lift arm assembly 74 provides a constant upward bias on main deck 28, a hold-down device 75 is utilized to maintain main deck 28 at a desired orientation. Once main deck 28 is pivoted by lift arm assembly 74 to its fully raised position, an operator will step on the main deck and walk main deck 28 down to the desired orientation. Once the desired orientation is reached, the operator will step off the main deck and hold-down device 75 will hold main deck 28 against the upward biasing force provided by lift arm assembly 74. Chain 77 is provided for releasing hold-down device 75. Chain 77, including a pull ring 79, extends through deck cup 150 that is welded to main deck 28 so that pull ring 79 can be grasped from the top of main deck 28 by an operator. A pulling action on chain 77 releases hold-down device 75, thereby resulting in main deck 28 being pivoted by lift arm assembly 74 to its fully raised position. Hold-down devices such as that designated by reference numeral 75 are in widespread use in the dock leveler industry.

The dock leveler of the present invention preferably includes retractable safety legs 65 that are forwardly biased to the position shown in FIG. 1. When in the position illustrated in FIG. 1, safety legs 65 will engage the top step 67 of landing pad 69, thereby preventing pivoting of main deck 28 to a below dock position. Chain 71 is attached at a first end 111 to connection bar 73 that connects safety legs 65. Chain 71 extends up through deck cup 150 where it is attached at a second end 113 to pull ring 75. An operator can retract safety legs 65 by pulling pull ring 117, thereby enabling main deck 28 to be pivoted to a position wherein its second edge 34 is below the level of loading dock platform 18. Safety legs 65 can be partially retracted to a position wherein they will engage second step 115 of landing pad 69 or they can be fully retracted to a position wherein they will not engage landing pad 69. When safety legs 69 are in the fully retracted position, main deck 28 can be pivoted to the below dock position illustrated in FIG. 4.

In accordance with the present invention, the dock leveler includes a lip plate having first and second opposite edges. The first edge of the lip plate is pivotably connected to the second edge of the main deck for pivoting the lip plate between a first and second position. As embodied herein, dock leveler 10 includes a lip plate 36 which is hingedly connected at a first edge 38 to second edge 34 of main deck 28.

Figure 3:
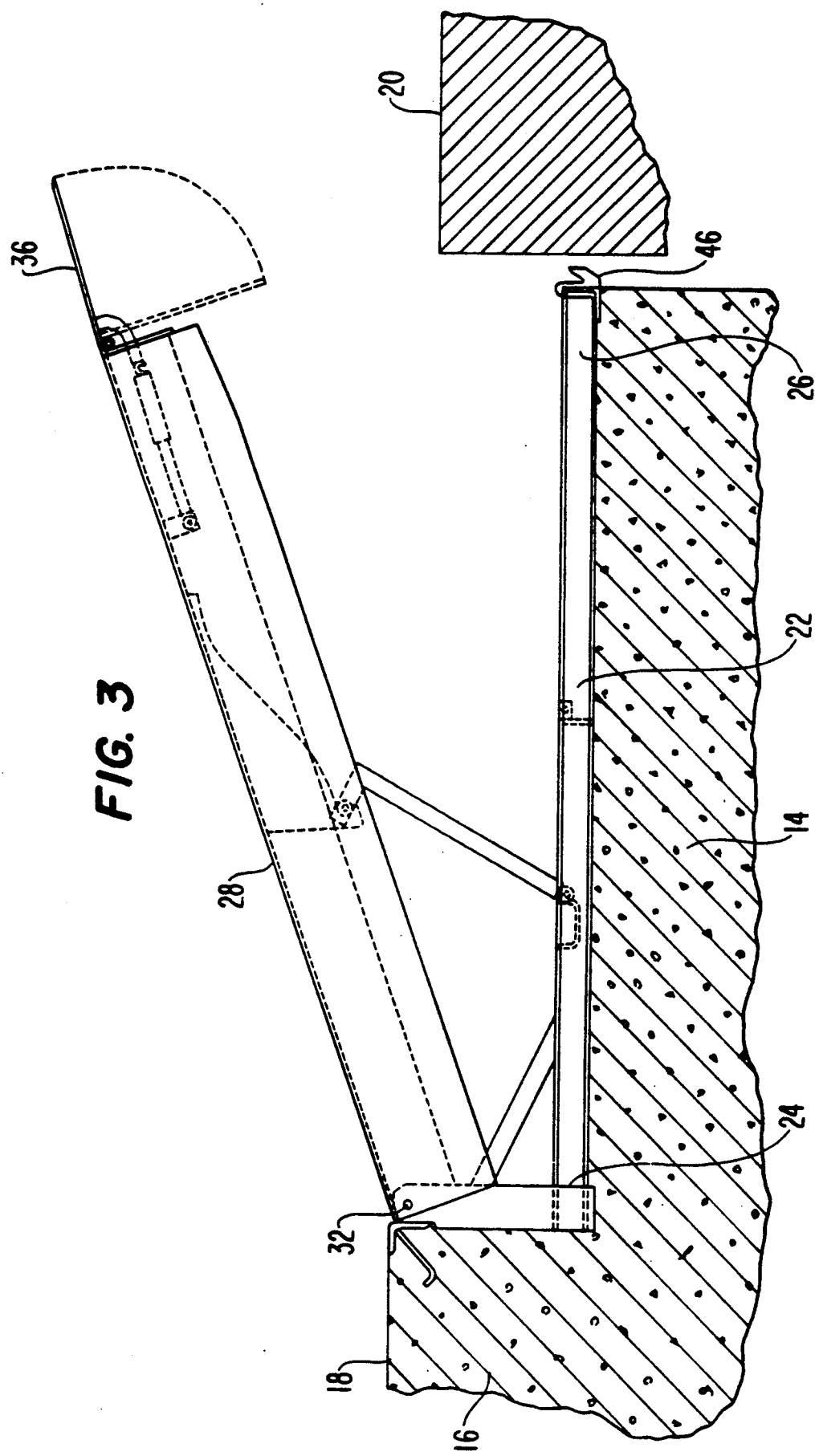
FIG. 3 is a sectional side view of the dock leveler illustrating the main deck in the fully raised position and the lip plate in the bridging position.

As further embodied herein, the first position of lip plate 36 is a bridging position shown in solid lines in FIGS. 2-4 for engaging the carrier bed 20. The second position of lip plate 36 is a stored position for supporting main deck 28 at a selected angle relative to loading dock platform 18. The stored position of lip plate 36 is illustrated by dotted lines in FIGS. 2 and 3.

Lip plate 36 is adapted to move between the stored position and the bridging position. When lip plate 36 is in a fully retracted stored position, i.e., substantially normal to main deck 28, a second edge 44 of lip plate 36 will rest in keepers 46 provided on the second end 26 of frame 22. This arrangement is illustrated by dotted lines in FIG. 2. When lip member 36 is in a fully extended bridging position, it will rest on the bed 20 of a carrier which is being unloaded or loaded. This arrangement allows the forklift to move between main deck 28 and the bed 20 of an adjacent carrier and is illustrated by solid lines in FIG. 2.

In accordance with the present invention, the dock leveler includes hinge means for pivotably connecting the second edge of the main deck to the first edge of the lip plate. The hinge means include at least one hinge tube. As embodied herein, dock leveler 10 includes hinge tubes 40 positioned adjacent second edge 34 of main deck 28 and first edge 38 of lip plate 36. Preferably, as shown in FIG. 5, a plurality of hinge tubes 40 are positioned side-by-side adjacent the entire first edge 38 of lip plate 36 and first edge 34 of main deck 28. Alternately positioned hinge tubes are connected to lip plate 36 and front plate 48, respectively. An elongated hinge pin 42 is inserted through hinge tube 40.

Further in accordance with the present invention, the dock leveler includes support means for strengthening the pivotal connection between the main deck and the lip plate. The support means conforms in shape to the hinge tube and extends outwardly therefrom. Preferably, the support means includes at least one gusset having an end that conforms in shape to the hinge tube, with that end being fixed to the hinge tube.

As embodied herein and as shown in FIG. 5, the support means includes at least one front plate gusset 50 connected to hinge tube 40 and extending onto front plate 48 and at least one lip plate gusset 52 connected to hinge tube 40 and extending onto lip plate 36. In the preferred embodiment of the present invention, a plurality of hinge tubes 40 are positioned adjacent second edge 34 of main deck 28 and first edge 38 of lip plate 36, and alternatively positioned hinge tubes 40 are connected to a front plate gusset 50 and a lip plate gusset 52, respectively.

As shown in FIGS. 5 and 7(a)–(c), front plate gusset 50 includes main plate 54 and side flanges 56 extending substantially perpendicular thereto. Main plate 54 includes a cut-out section 55 to permit easy access to grease fittings 49 on hinge tubes 40. Side flanges 56 have a rear end 58 fixedly connected to the hinge tube 40 and a bottom surface 60 fixedly connected to front plate 48. Rear end 58 of side flanges 56 conforms to the shape of the hinge tube 40.

Figure 6A:
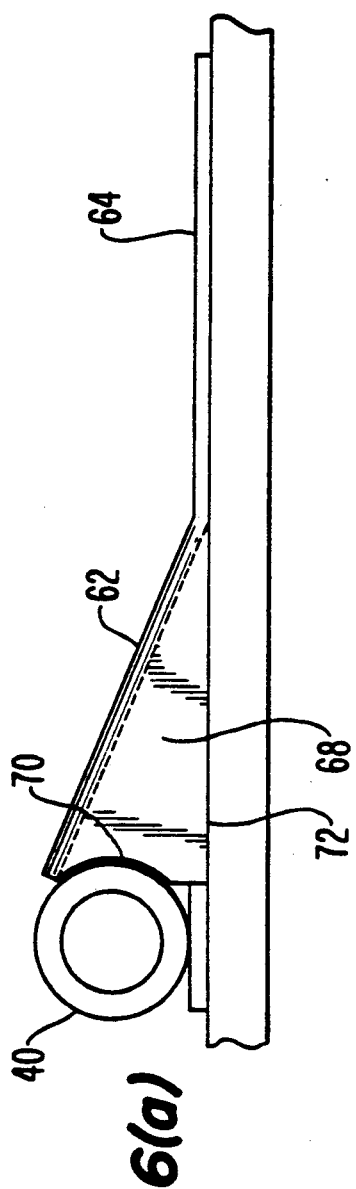
FIG. 6(a) is a side view of the lip plate gusset connected to the lip plate and the hinge tube.
Figure 6B:
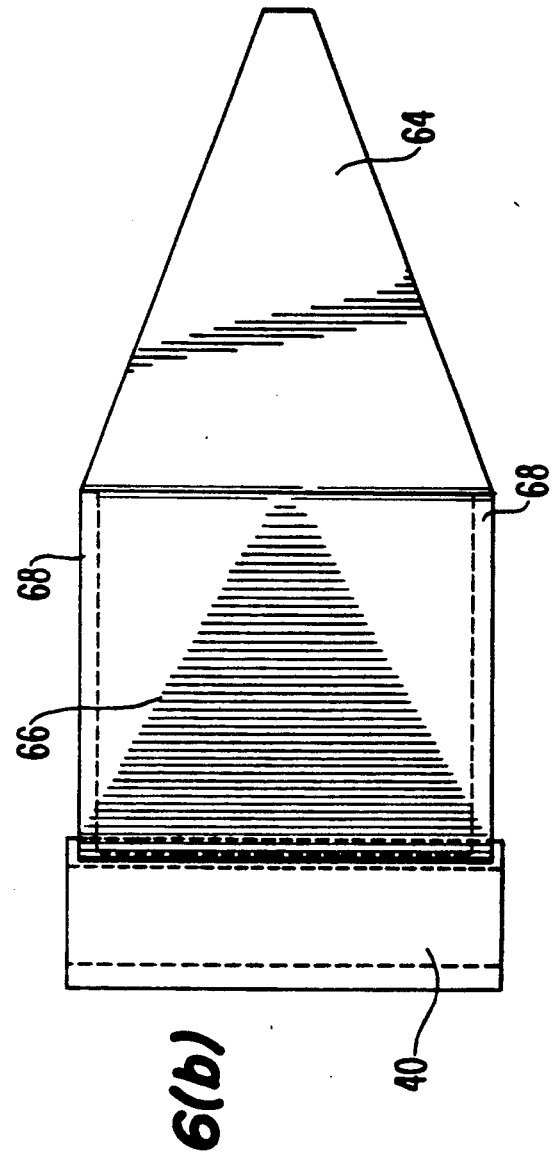
FIG. 6(b) is a top view of the lip plate gusset shown in FIG. 6(a)

As shown in FIGS. 5, 6(a) and 6(b), lip plate gussets 52 include a rear portion 62 adjacent hinge tube 40 and a front portion 64 extending outwardly therefrom onto lip plate 36. Rear portion 62 includes main plate 66 that is inclined with respect to front portion 64. Main plate 66 includes cut-out section 63 to permit easy access to grease fittings 49 on hinge tubes 40. Rear portion 62 further includes side flanges 68 having a rear end 70 connected to the hinge tube 40 and a bottom surface 72. Bottom surface 72 of side flanges 68 and front portion 64 are fixedly connected to lip plate 36. Rear end 70 of side flanges 68 conforms to the shape of the hinge tubes 40.

As shown in FIG. 6(b), the front portion 64 of lip plate gussets 52 is substantially triangular in shape. Because front portion 64 is disposed outwardly from hinge tubes 40 a greater distance than rear portion 62, the stress in the area of lip plate 36 overlaid by front portion 64 is less than the stress in the area of lip plate 36 overlaid by rear portion 62. Accordingly, the triangular shape of front portion 64 provides sufficient support to the lip plate. Also, the triangularly shaped front portion 64 results in a lip plate gusset that is lower in weight and utilizes less material than a lip plate gusset with a rectangularly shaped front portion. Preferably, front portion 64 of lip plate gusset 52 does not extend to second edge 44 of lip plate 36 because the portion of lip plate 36 adjacent second edge 44 will rest on the bed of a carrier.

In addition to strengthening the pivotal connection between the main deck and the lip plate, lip plate gussets also strengthen the lip plate. Accordingly, a thinner lip plate may be utilized thereby resulting in a savings in manufacturing costs.

Figure 9:
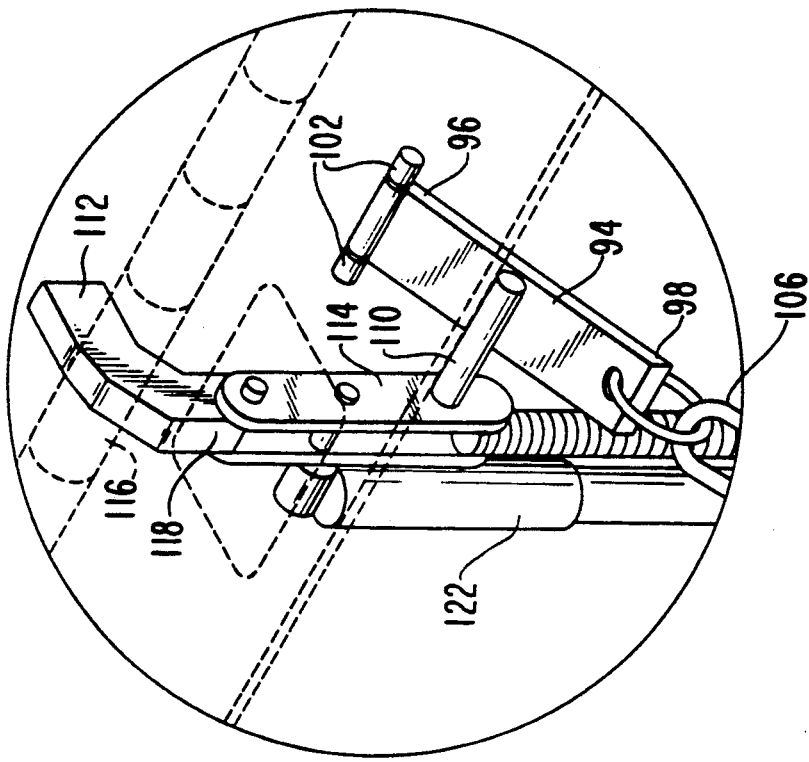
FIG. 9 is an enlarged perspective view illustrating the lip pivoting means of the present invention.
Figure 8:
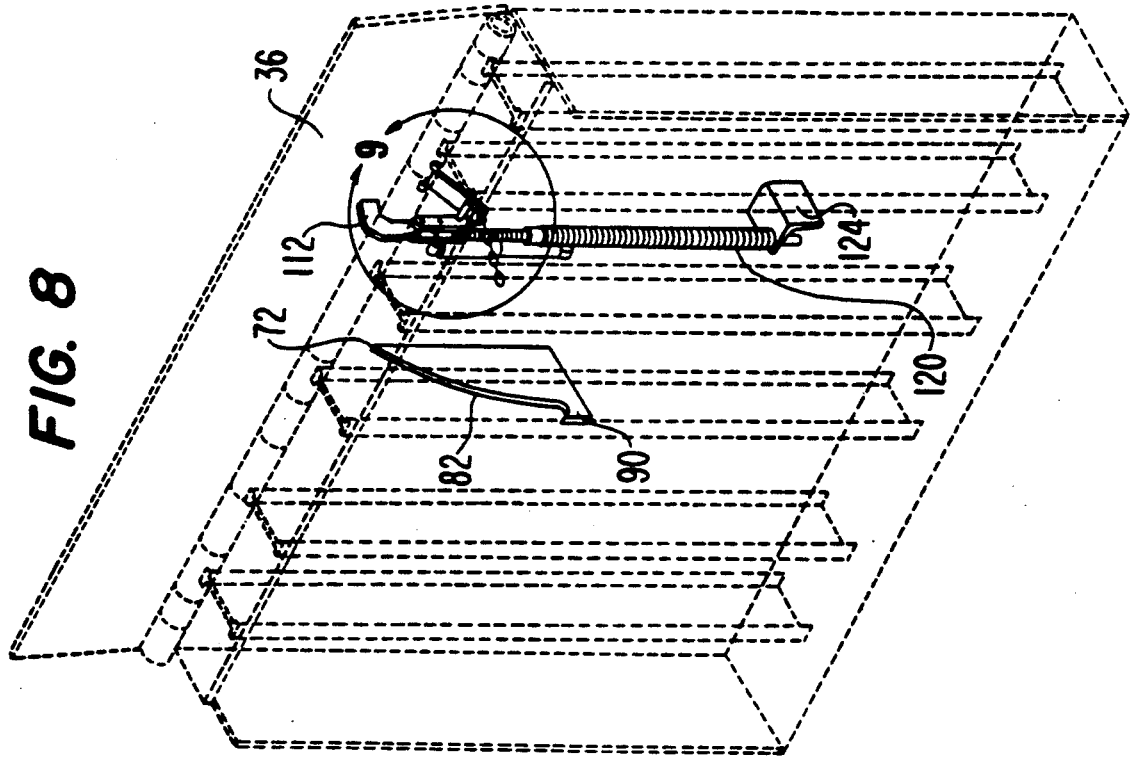
FIG. 8 is a perspective view of the underside of the main deck and lip plate of the dock leveler of the present invention.
Figure 10:
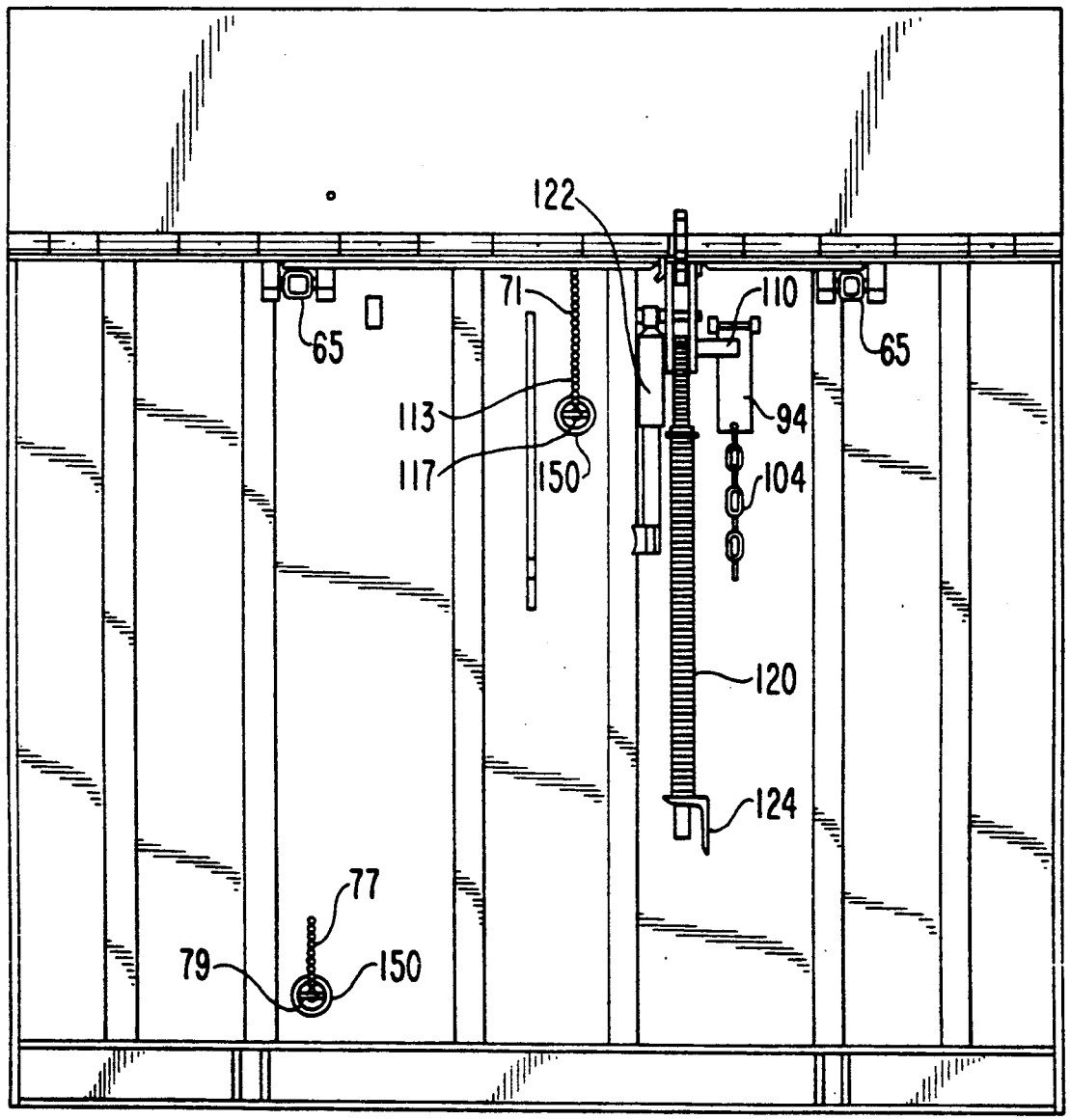
FIG. 10 is a bottom plan view of the main deck and lip plate of the dock leveler of the present invention.

In accordance with the present invention, the dock leveler includes means for pivoting the lip plate from the first position to the second position. The lip plate pivoting means includes means for maintaining the lip plate in the second position at times when the main deck is in its second position. As embodied herein and shown in FIGS. 2, 8 and 9, the means for pivoting the lip plate includes linkage means attached to main deck 28, means for pivoting the linkage means in response to upper movement of main deck 28 to its second position, and lip extension means responsive to pivotal movement of the linkage means for extending lip plate 36 to its second position. The linkage means includes a plate 94 having a first end 96 and a second end 98. First end 96 is pivotably connected to the underside of main deck 28 by pivot rod 100 and pivot tubes 102. The means for pivoting plate 94 includes a chain 104 having a first end 106 connected to second end 98 of plate 94. Chain 104 is dimensioned to pivot plate 96 when second edge 34 of main deck 28 is pivoted to its second position. Second end 108 of chain 104 is connected to frame 22 through snubber spring 107. Chain 104 becomes taut at times when main deck 28 is pivoted to its second position, thereby exerting a force on plate 94 to pivot plate 94 about pivot rod 100.

As embodied herein, the lip extension means includes a lip extension member and a slide bar 110 disposed to engage plate 94 and slide along plate 94 as the plate is pivoted. Movement of slide bar 110 causes the lip extension member to extend the lip plate 36 to the second position. As embodied herein, lip extension member includes pivot block 112 and a main member 114. Pivot block 112 has a first end 116 fixedly connected to lip plate 36 and a second end 118 pivotally connected to main member 114.

Figure 11:
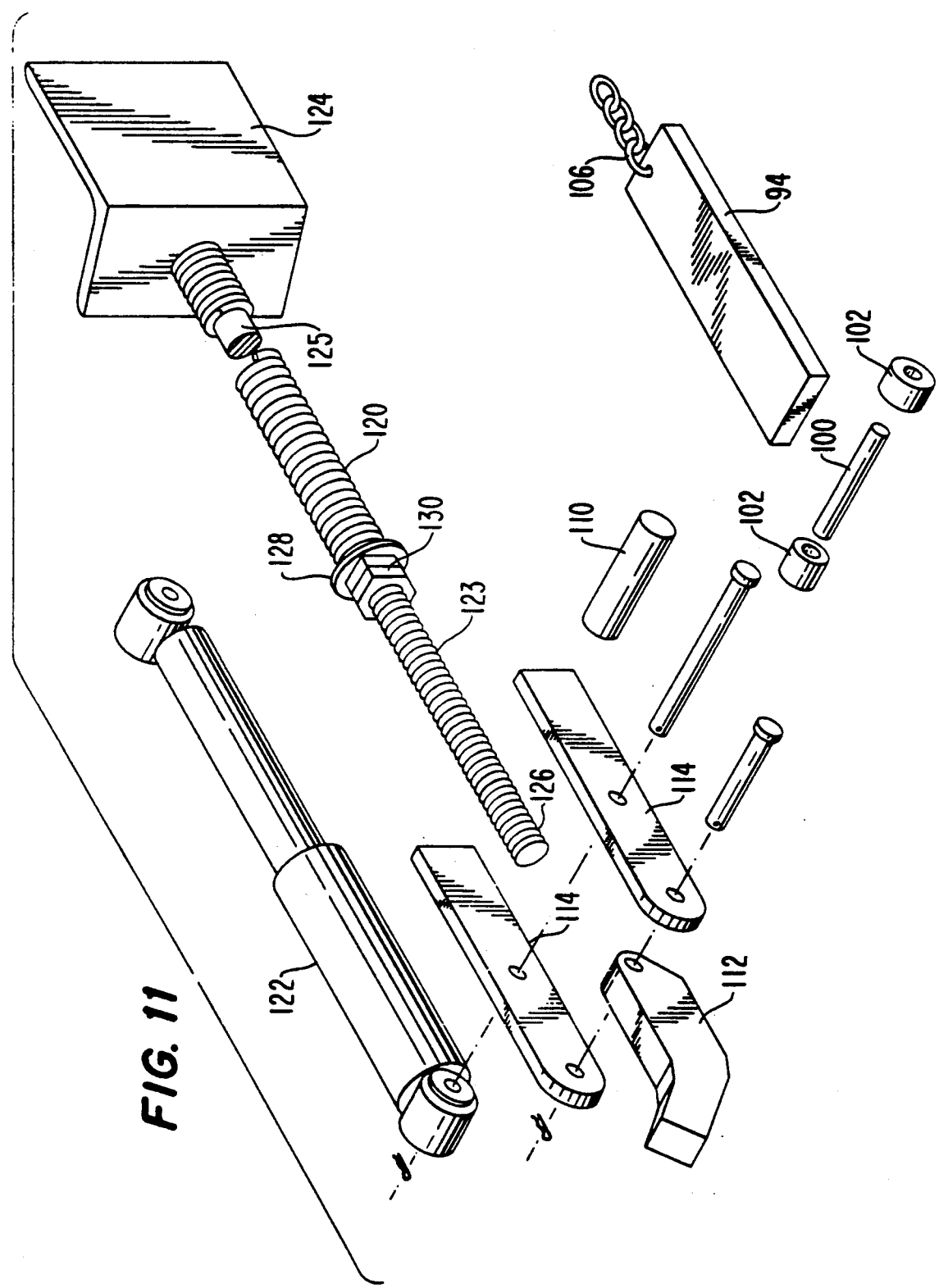
FIG. 11 is a exploded view of the lip pivoting means and lip counterbalancing means of the present invention.

Preferably, the lip extension means includes counterbalancing means for reducing the force necessary to extend the lip plate to the second position. As embodied herein and as shown in FIG. 11, the counterbalancing means includes compression spring 120 and counterbalance rod 123 that is inserted through compression spring 100. Counterbalance rod 123 is connected at a first end 125 to angle iron 124 that is affixed to main deck 28. A second end 126 of rod 123 is welded to main member 114. Compression spring 120 extends between angle iron 124 and washer 128. Nut 130 is threadably engaged on rod 123 to adjust the amount of compression in spring 120. For instance, moving nut 130 closer to angle iron 124 increases the compression of spring 120, thereby increasing the counterbalancing force applied to lip plate 36. This arrangement permits sensitive adjustment of the counterbalancing force applied to lip plate 36.

Preferably, dock leveler 10 includes means for controlling the rate of descent of lip plate 36 as it pivots from the second position to the first position. As embodied herein, the means for controlling the rate of descent of lip plate 36 is shock absorber 122 that is connected, either fixedly or pivotably, to main member 114.

When main deck 28 is in position co-planar with loading dock platform 18 and lip plate 36 is in the stored position, main member 114, shock absorber 122 and plate 94 are substantially parallel to main deck 28. Slide bar 110 is disposed at approximately the mid-point of plate 94. When hold-down device 75 is released and lift arm assembly 74 pivots main deck 28 to its fully raised position, chain 104 becomes taut and pulls down and out on plate 94. This causes slide rod 110 to slide up plate 94 toward pivot tubes 102. As lip plate 94 is pivoted by chain 104, slide rod 110 is pushed toward second edge 44 of lip plate 36 thereby causing main member 114 and pivot block 112 to extend lip plate 36 to its bridging position. Main member 114 and pivot block 112 will maintain lip plate 36 in the bridging position at times when main deck 28 is in the second position. Yet, lip plate 36 is yieldable from the bridging position should it be impacted by a truck backing into the loading dock.

In accordance with the present invention, a deck cup for housing a dock leveler pull ring having a chain attached thereto is provided. As embodied herein and as shown in FIGS. 12(a)–12(c), dock leveler 10 includes deck cup 150 comprising a substantially tubular body having an open top 152 and bottom 154. The substantially tubular body has a non-uniform inside diameter, with the portion of the tubular body adjacent bottom 154 having a decreased diameter 156 to form an interior constriction 158 for holding a pull ring. Bottom 154 of the tubular body is flared outwardly for providing a smooth surface for contacting the chain attached to the pull ring. Preferably, the diameter of the flared bottom is substantially the same as the diameter of the top 152.

It will be apparent to those skilled in the art that various modifications and variations can be made in the dock leveler of the present invention without departing from the scope or spirit of the present invention. Thus, it is intended that the present invention cover the modifications and variations of the invention which come within the scope of the appended claims or their equivalents.

What is claimed is:

1. A dock leveler for bridging a gap between a loading dock and a carrier bed comprising:
    a frame having a first end to be disposed adjacent a loading dock platform and a second opposite end spaced outwardly from said first end;
    a main deck having first and second opposite edges, the first edge pivotably connected to the first end of the frame for pivoting the main deck relative to the plane of the loading dock platform between a first and second position;
    a lip plate having first and second opposite edges, the first edge of the lip plate pivotably connected to the second edge of the main deck for pivoting the lip plate between a first and second position;
    hinge means for pivotably connecting the second edge of the main deck to the first edge of the lip plate, said hinge means including at least one hinge tube having an outer curved surface;
    support means for strengthening the pivotal connection between the main deck and the lip plate, the support means having an inner curved surface conforming in shape to the outer curved surface of the hinge tube and extending outwardly therefrom.

2. The dock leveler of claim 1, wherein the support means includes at least one gusset having an end that conforms in shape to the hinge tube, with said end being fixed to the hinge tube.

3. The dock leveler of claim 2, further comprising a front plate connected to the main deck adjacent its second edge and extending downward therefrom, wherein the support means includes at least one front plate-gusset connected to the hinge tube and extending onto the front plate.

4. The dock leveler of claim 2, wherein the support means includes at least one lip plate gusset connected to the hinge tube and extending onto the lip plate.

5. The dock leveler of claim 2, further comprising a front plate connected to the main deck adjacent the second edge of said main deck and extending downward therefrom, wherein the support means includes at least one front plate gusset connected to the hinge tube and extending onto the front plate and at least one lip plate gusset connected to the hinge tube and extending onto the lip plate.

6. The dock leveler of claim 5, wherein a plurality of hinge tubes are positioned adjacent the second edge of the main deck and the first edge of the lip plate, and alternately positioned hinge tubes are connected to a front plate gusset and a lip plate gusset, respectively.

7. The dock leveler of claim 6, wherein the front plate gussets include a main plate and side flanges extending substantially perpendicular thereto, said side flanges having a rear end fixedly connected to the hinge tube and a bottom surface fixedly connected to the front plate, the rear end of the side flanges conforming to the shape of the hinge tube.

8. The dock leveler of claim 7, wherein the lip plate gussets include a rear portion adjacent the hinge tube and a front portion extending outwardly therefrom, the rear portion including a main plate that is inclined with respect to the front portion, the rear portion further including side flanges extending substantially perpendicular to the main plate, said side flanges having a rear end fixedly connected to the hinge tube and a bottom surface, the bottom surface of the side flanges and the front portion of the lip plate gusset being fixedly connected to the lip plate, the rear end of the side flanges conforming to the shape of the hinge tube.

9. A dock leveler for bridging a gap between a loading dock and a carrier bed comprising:
    a frame having a first end to be disposed adjacent a loading dock platform and a second opposite end spaced outwardly from said first end;
    a main deck having first and second opposite edges, the first edge pivotably connected to the first end of the frame for pivoting the main deck relative to the plane of the loading dock platform between a below dock position wherein the second edge is at its lowest position below the loading dock platform and a fully raised position wherein the second edge is at its highest position above the loading dock platform;
    a lip plate having first and second opposite edges, the first edge of the lip plate pivotably connected to the second edge of the main deck for pivoting the lip plate between a bridging position for engaging the carrier bed and a stored position for supporting the main deck at a selected angle relative to the loading dock platform;
    a front plate connected to the main deck adjacent its second edge and extending downward therefrom;
    a plurality of hinge tubes positioned adjacent the second edge of the main deck and the first edge of the lip plate and a hinge pin inserted through said plurality of hinge tubes, said plurality of hinge tubes and said hinge pin pivotably connecting the second edge of the main deck to the first edge of the lip plate; and
    a plurality of front plate gussets and lip plate gussets, with alternately positioned hinge tubes connected to a front plate gusset and a lip plate gusset, respectively, said front plate gussets and lip plate gussets strengthening the pivotal connection between the main deck and the lip plate;
    the front plate gussets including a main plate and side flanges extending substantially perpendicular thereto, the side flanges having a rear end fixedly connected to a hinge tube and a bottom surface fixedly connected to the front plate, the rear end of the side flanges conforming to the shape of the hinge tubes;
    the lip plate gussets including a rear portion adjacent the hinge tube and a front portion extending outwardly therefrom, the rear portion including a main plate that is inclined with respect to the front portion, the rear portion further including side flanges extending substantially perpendicular to the main plate, the side flanges having a rear end fixedly connected to a hinge tube and a bottom surface, the bottom surface of the side flanges and the front portion of the lip plate gusset being fixedly connected to the lip plate, the rear end of the side flanges conforming to the shape of the hinge tubes.

10. A dock leveler for bridging a gap between a loading dock and a carrier bed comprising:
   a frame having a first end to be disposed adjacent a loading dock platform and a second opposite end spaced outwardly from said first end;
   a main deck having first and second opposite edges, said first edge pivotably connected to said first end of said frame for pivoting said main deck relative to the plane of the loading dock platform between a first and second position;
   a lip plate having first and second opposite edges, the first edge of the lip plate pivotably connected to the second edge of the main deck for pivoting the lip plate between a first and second position;
   means for pivoting the main deck about its first edge to its second position; and
   means for pivoting the lip plate from the first position to the second position, said lip plate pivoting means including means for maintaining the lip plate in the second position at times when the main deck is in the second position.

11. A dock leveler as recited in claim 10, wherein the first position of the main deck is a below dock position wherein the second edge of said main deck is at its lowest position below the loading dock platform and the second position of the main deck is a fully raised position wherein the second edge of said main deck is at its highest position above the loading dock platform, and wherein the first position of the lip plate is a stored position for supporting the main deck at a selected angle relative to the loading dock platform and the second position of the lip plate is a bridging position for engaging the carrier bed.

12. The dock leveler of claim 11, wherein the lip plate pivoting means includes linkage means attached to the main deck, means for pivoting means in response to upward movement of the main deck to its fully raised position, and lip extension means responsive to pivotal movement of the linkage means for extending the lip plate to the bridging position.

13. The dock leveler of claim 12, further comprising means for controlling the rate of descent of the lip plate as it pivots from the bridging position to the stored position.

14. The dock leveler of claim 13, wherein the means for controlling the rate of descent of the lip plate is a shock absorber connected to the lip extension means.

15. The dock leveler of claim 12, wherein the linkage means includes a plate having a first and second end, with the first end being pivotally connected to the main deck, and the means for pivoting the linkage means includes a chain having a first end connected to the second end of the plate, the chain being dimensioned to pivot the plate when the second edge of the main deck is pivoted to its second position.

16. The dock leveler of claim 15, wherein the lip extension means includes a lip extension member and a slide bar disposed to engage the plate and slide along said plate as the plate is pivoted, the movement of the slide bar causing the lip extension member to extend the lip plate to the bridging position.

17. The dock leveler of claim 16, wherein the lip extension member includes a pivot block and a main member, the pivot block having a first end fixedly connected to the lip plate and a second end pivotally connected to the main member.

18. The dock leveler of claim 17, wherein the lip extension means includes counterbalancing means for reducing the force necessary to extend the lip plate to the bridging position.

19. The dock leveler of claim 18, wherein the counterbalancing means is a compression spring.

20. The dock leveler of claim 10, wherein the means for pivoting the main deck includes:
   a cam connected to the main deck;
   a pivotable lift arm having a first and second end, the first end being pivotably connected to the dock leveler frame and the second end including a roller adapted to move along the cam surface as the lift arm pivots about its first end;
   a pair of springs connected to the lift arm to provide a biasing force for pivoting the main deck to its second position; and
   an adjustment nut for adjusting the biasing force provided by the pair of springs.

21. A dock leveler for bridging a gap between a loading dock platform and a carrier bed comprising:
   a frame having a first end to be disposed adjacent a loading dock platform and a second opposite end spaced outwardly from said first end;
   a main deck having first and second opposite edges, the first edge pivotably connected to the first end of the frame for pivoting the main-deck relative to the plane of the loading dock platform between a below dock position wherein the second edge is at its lowest position below the loading platform and a fully raised position wherein the second edge is at its highest position above the loading dock platform;
   a lip plate having first and second opposite edges, the first edge of the lip plate pivotably connected to the second edge of the main deck for pivoting the lip plate between a bridging position for engaging the carrier bed and a stored position for supporting the main deck at a selected angle relative to the loading dock platform;
   means for pivoting the main deck about its first edge to its fully raised position;
   linkage means attached to the main deck;
   a chain having a first end connected to the linkage means and a second end connected to the frame, the chain being dimensioned to pivot the linkage means at times when the main deck is pivoted to the fully raised position;
   a lip extension member and a slide bar, the slide bar disposed to engage and slide along the linkage means as the linkage means is pivoted, the movement of the slide bar causing the lip extension member to extend the lip plate to the bridging position and to maintain the lip plate in the bridging position at times when the main deck is in the fully raised position.

22. A dock leveler for bridging a gap between a loading dock and a carrier bed comprising:
   a frame having a first end to be disposed adjacent a loading dock platform and a second opposite end spaced outwardly from said first end;

a main deck having first and second opposite edges, the first edge pivotably connected to the first end of the frame for pivoting the main deck relative to the plane of the loading dock platform between a first and second position;

a lip plate having first and second opposite edges, the first edge of the lip plate pivotably connected to the second edge of the main deck for pivoting the lip plate between a first and second position;

hinge means for pivotably connecting the second edge of the main deck to the first edge of the lip plate, the hinge means including at least one hinge tube;

support means for strengthening the pivotal connection between the main deck and the lip plate, the support means conforming in shape to the hinge tube and extending outwardly therefrom;

means for pivoting the main deck about its first edge from its first position to its second position; and means for pivoting the lip plate from its first position to its second position, the lip plate pivoting means including means from maintaining the lip plate in its second position at times when the main deck is in its second position.

23. A dock leveler for bridging a gap between a loading dock and a carrier bed comprising:

a frame having a first end to be disposed adjacent a loading dock platform and a second opposite end spaced outwardly from said first end;

a main deck having first and second opposite edges, the first edge pivotably connected to the first end of the frame for pivoting the main deck relative to the plane of the loading dock platform between a below dock position wherein the second edge is at its lowest position below the loading dock platform and a fully raised position wherein the second edge is at its highest position above the loading dock platform;

a lip plate having first and second opposite edges, the first edge of the lip plate pivotably connected to the second edge of the main deck for pivoting the lip plate between a bridging position for engaging the carrier bed and a stored position for supporting the main deck at a selected angle relative to the loading dock platform;

a front plate connected to the main deck adjacent its second edge and extending downward therefrom;

hinge means for pivotably connecting the second edge of the main deck to the first edge of the lip plate, the hinge means including a plurality of hinge tubes positioned adjacent the second edge of the main deck and the first edge of the lip plate and a hinge pin inserted through said plurality of hinged tubes;

support means for strengthening the pivotal connection between the main deck and the lip plate, the support means including a plurality of front plate gussets and lip plate gussets with alternately positioned hinged tubes connected to a front plate gusset and lip plate gusset respectively, both the front plate gusset and lip plate gusset including a rear end that conforms to the shape of the hinge tube and is connected thereto;

means for pivoting the main deck about its first edge to its fully raised position;

linkage means attached to the main deck;

a chain having a first end connected to the linkage means and a second end connected to the frame, the chain being dimensioned to pivot the linkage means at times when the main deck is pivoted to the fully raised position;

a lip extension member and a slide bar, the slide bar disposed to engage and slide along the linkage means as the linkage means is pivoted, the movement of the slide bar causing the lip extension member to extend the lip plate to the bridging position and to maintain the lip plate in the bridging position at times when the main deck is in the fully raised position.

* * * * *

UNITED STATES PATENT AND TRADEMARK OFFICE
CERTIFICATE OF CORRECTION

PATENT NO. : 5,123,135
DATED : June 23, 1992
INVENTOR(S) : COOK et al.

It is certified that error appears in the above-identified patent and that said Letters Patent is hereby corrected as shown below:

ON THE TITLE PAGE

In the Abstract, line 9, change "gate" to --plate--.

Signed and Sealed this

Tenth Day of August, 1993

Attest:

MICHAEL K. KIRK

*Attesting Officer*     *Acting Commissioner of Patents and Trademarks*